US009268347B2

(12) United States Patent
Covi et al.

(10) Patent No.: US 9,268,347 B2
(45) Date of Patent: Feb. 23, 2016

(54) IMPLEMENTING DYNAMIC REGULATOR OUTPUT CURRENT LIMITING

(71) Applicant: International Business Machines Corporation, Armonk, NY (US)

(72) Inventors: Kevin R. Covi, Glenford, NY (US); Patrick K. Egan, Rochester, MN (US); James D. Jordan, Round Rock, TX (US); Jordan R. Keuseman, Rochester, MN (US); Michael L. Miller, Rochester, MN (US); Guillermo J. Silva, Austin, TX (US); Malcolm S. Allen-Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 13/764,858

(22) Filed: Feb. 12, 2013

(65) Prior Publication Data
US 2014/0225586 A1 Aug. 14, 2014

(51) Int. Cl.
*H02M 1/32* (2007.01)
*H02M 3/158* (2006.01)
*G05F 1/46* (2006.01)
*H02M 3/156* (2006.01)
*H02M 3/157* (2006.01)
*H02M 1/00* (2007.01)

(52) U.S. Cl.
CPC ............. *G05F 1/462* (2013.01); *H02M 1/32* (2013.01); *H02M 3/1584* (2013.01); *H02M 3/156* (2013.01); *H02M 3/157* (2013.01); *H02M 3/158* (2013.01); *H02M 2001/0009* (2013.01)

(58) Field of Classification Search
CPC ............. H02M 2001/0012; H02M 2001/0022; H02M 1/32; H02M 3/156; H02M 3/1584
See application file for complete search history.

(56) References Cited

U.S. PATENT DOCUMENTS

| 3,750,004 | A | 7/1973 | Walker |
| 4,127,885 | A | 11/1978 | Adam et al. |
| 4,835,649 | A | 5/1989 | Salerno |
| 5,268,631 | A | 12/1993 | Gorman et al. |
| 6,163,712 | A | 12/2000 | Winkler et al. |
| 6,836,100 | B2 | 12/2004 | Egan et al. |
| 8,089,743 | B2 | 1/2012 | Jian |
| 8,766,615 | B2 * | 7/2014 | Nishida et al. ................. 323/283 |
| 2005/0085960 | A1 | 4/2005 | Lumbis et al. |

(Continued)

FOREIGN PATENT DOCUMENTS

| CN | 1549076 A | 11/2004 |
| JP | 10066359 A | 3/1998 |
| JP | 2001238434 A | 8/2001 |

OTHER PUBLICATIONS

U.S. Appl. No. 13/288,346, filed Nov. 3, 2011, "Minimizing Aggregate Cooling and Leakage Power with Fast Convergence" by John B. Carter et al.

(Continued)

*Primary Examiner* — Timothy J Dole
*Assistant Examiner* — Ishrat Jamali
(74) *Attorney, Agent, or Firm* — Joan Pennington

(57) ABSTRACT

A method and apparatus are provided for implementing dynamic regulator output current limiting. An input power to the regulator is measured, and the measured input power is related to a regulator output current and a regulator over current trip point, and dynamically used for providing dynamic regulator output current limiting.

19 Claims, 4 Drawing Sheets

(56) References Cited

U.S. PATENT DOCUMENTS

| | | | |
|---|---|---|---|
| 2006/0077604 A1 | 4/2006 | Jansen | |
| 2006/0238183 A1 | 10/2006 | DeVries, Jr. et al. | |
| 2008/0111526 A1* | 5/2008 | Shuey | 323/274 |
| 2008/0266740 A1* | 10/2008 | Smith | 361/91.5 |
| 2009/0195230 A1* | 8/2009 | Adkins et al. | 323/282 |
| 2012/0051097 A1 | 3/2012 | Zhang et al. | |

OTHER PUBLICATIONS

U.S. Appl. No. 13/526,194, filed Apr. 27, 2012, "Current-Aware Floorplanning to Overcome Current Delivery Limitations in Integrated Circuits", by Pradip Bose et al.

U.S. Appl. No. 13/892,684, filed Jun. 18, 2012, "Automating Current-Aware Integrated Circuit and Package Design and Optimization", by John A. Darringer et al.

U.S. Appl. No. 13/526,230, filed Jun. 18, 2012, "Adaptive Workload Based Optimizations to Mitigate Current Delivery Limitations in Integrated Circuits", by Pradip Bose et al.

U.S. Appl. No. 13/526,153, filed Jun. 18, 2012, "Token-Based Current Control to Mitigate Current Delivery Limitations in Integrated Circuits", Pradip Bose et al.

U.S. Appl. No. 13/526,252, filed Jun. 18, 2012, "Adaptive Workload Based Optimizations Coupled With a Heterogeneous Current-Aware Baseline Design to Mitigate Current Delivery Limitations in Integrated Circuits", Pradip Bose et al.

\* cited by examiner

IMPLEMENTING DYNAMIC REGULATOR OUTPUT CURRENT LIMITING

FIELD OF THE INVENTION

The present invention relates generally to the data processing field, and more particularly, relates to method and apparatus for implementing dynamic regulator output current limiting.

DESCRIPTION OF THE RELATED ART

A need exists for accurate measurement of regulator output that can be related to a regulator shut down current limit and that can be measured at a higher rate of speed.

Many regulator output current sensing arrangements have tolerance issues requiring calibration and cause increased power dissipation in the monitored regulator. Regulator output current sensing arrangements that include an in-line circuit to measure the regulator output current would generate unacceptable increases in heat and losses delivering the current to the monitored regulator.

Accurate measurement of regulator output is needed to support system functions like higher performance frequency, where the closer the regulator can run against predefined power limits without the regulator shutting down, then higher performance frequency can be maintained.

In addition, accurate measurement is needed when redundant power is available in regulator designs implementing redundancy, such as redundancy at a phase level, having modes of operation N, N+1, and N+2 which can be used as long as the failover is assured. More power is available when operational mode N+2 is available, and when in operational mode N+2 the load could be set at operational mode N+1, if accurate measurement can be assured.

U.S. Pat. No. 6,836,100 to Egan et al., issued Dec. 28, 2004 and assigned to the present assignee, discloses a phase redundant regulator apparatus and method for implementing redundancy at a phase level with a phase redundant regulator apparatus. The subject matter of the above-identified U.S. Pat. No. 6,836,100 is incorporated herein by reference.

A need exists for an efficient and effective method and apparatus for implementing dynamic regulator output current limiting.

SUMMARY OF THE INVENTION

Principal aspects of the present invention are to provide a method and apparatus for implementing dynamic regulator output current limiting. Other important aspects of the present invention are to provide such method and apparatus substantially without negative effects and that overcome many of the disadvantages of prior art arrangements.

In brief, a method and apparatus are provided for implementing dynamic regulator output current limiting. An input power to the regulator is measured, and the measured input power is related to a regulator output current and a regulator over current trip point, and dynamically used for providing dynamic regulator output current limiting.

In accordance with features of the invention, an inline shunt resistor is used to measure the regulator input current. A hardware operational amplifier (Op-amp) comparator circuit creates a voltage from the regulator that is proportional to the regulator output current.

In accordance with features of the invention, the measured input power is read with a high speed digital-to-analog comparator (DAC).

In accordance with features of the invention, the measured input power being related to the regulator over current trip point includes a soft over current warning that is used on output current. Input power is measured at the point of the soft over current for fast monitoring when soft OC point is being approached.

In accordance with features of the invention, a tolerance build up is removed between output over current and input power sensing where input power is related to a soft over current trip point and the regulator over current trip point calculation is adjusted based upon a voltage set point.

In accordance with features of the invention, a redundant system is used where additional power of redundant phases can be used for performance improvements and where the additional power of redundant system that is used includes changing a soft over current (OC) trip point as a function of operational modes N+2, N+1 or N phase or phases running, enabling reduction of stack up errors.

In accordance with features of the invention, the measured input power is related to the operational mode N+2, N+1 or N phase or phases running. The load frequency is only decreased in operational mode N when the measured input power is greater than a regulator over current threshold.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and apparatus are provided for implementing dynamic regulator output current limiting. An inline shunt resistor is used to measure the regulator input current. A hardware Op-amp comparator circuit creates a voltage from the regulator that is proportional to the regulator output current. The measured input current and voltage is read with a high speed digital-to-analog comparator (DAC) where they are multiplied to get the regulator's input power.

In accordance with features of the invention, a measured regulator input power is related to a regulator over current trip point and includes a soft over current warning that is used on output current. Input power is measured at the point of the soft over current for fast monitoring when soft OC point is being approached. A redundant regulator system includes operational modes N+2, N+1 or N phase or phases running and the measured input power is related to the operational mode N+2, N+1 or N phase or phases running. The load frequency is only decreased in operational mode N when the measured input power is greater than a regulator over current threshold.

Figure 1:
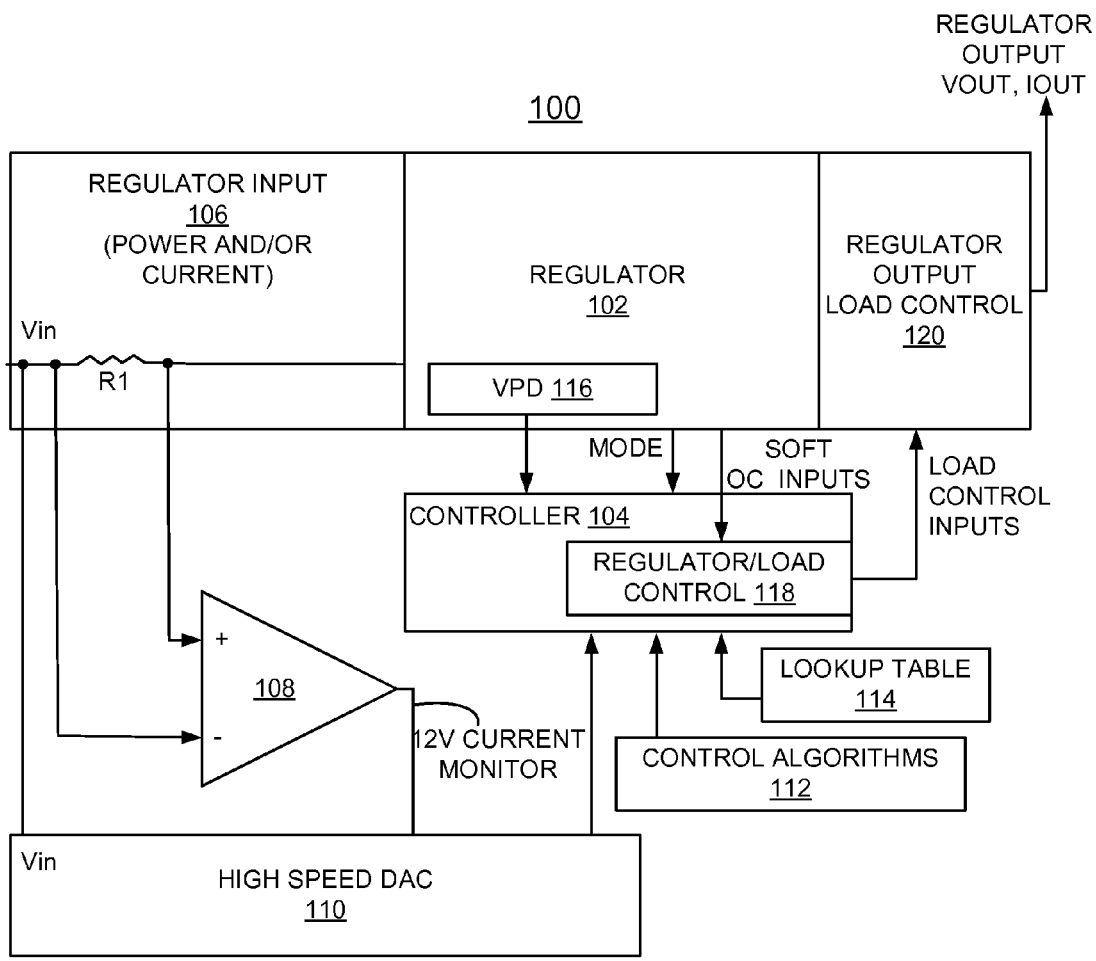
FIG. 1 is a block diagram schematically illustrating example apparatus for implementing dynamic regulator output current limiting in accordance with the preferred embodiment.

Referring now to FIG. 1, there is shown example apparatus for implementing dynamic regulator output current limiting in accordance with the preferred embodiment generally designated by the reference character 100. Control apparatus 100 includes a regulator 102, and a controller 104. Control apparatus 100 includes a regulator input 106 of power and/or current and an Op-amp comparator circuit 108.

Control apparatus 100 includes an input voltage Vin and a shunt inline resistor R1 of the regulator input 106 used to measure the regulator input current. A hardware Op-amp comparator circuit 108 amplifies the input voltage across the shunt inline resistor R1 measuring the regulator input current from the regulator input 106 and providing an output labeled 12V CURRENT MONITOR applied to a high speed digital-to-analog comparator (DAC) 110. The monitored input voltage Vin is applied to the high speed DAC 110. The measured input power can be calculated from the voltage and current inputs to the high speed DAC 110, which provides an output proportional to the regulator output current to the controller 104.

As shown in FIG. 1, the controller 104 receives a plurality of inputs from the high speed DAC 110, control algorithms 112, lookup table 114, vital product data (VPD) 116, and optionally operational mode from the regulator 102 in a redundant regulator system 102. Control apparatus 100 includes a regulator control function 118 that receives over current (OC) inputs including a soft current over current trip output and output current trip point from the regulator 102 and providing load control from the controller 104 to a regulator output load control 120 to selectively decrease load for a measured input current greater than an identified over current threshold CCAP, and to selectively increase load for a measured input current less than the identified over current threshold CCAP and less than a maximum load.

A frequency of regulator output load processor is lowered by regulator control function 118, for example to selectively decrease the load for a measured input current greater than an identified over current threshold CCAP. In a redundant regulator system including operational modes N+2, N+1, and N, the load frequency is only decreased in operational mode N when the measured input power is greater than a regulator over current threshold. In operational modes N+2, N+1, running at full frequency is enabled.

The controller 104 uses selected multiple inputs from the high speed DAC 110, control algorithms 112, lookup table 114, vital product data (VPD) 116, operational mode, and OC status inputs, for example, as provided by the following equation that relates input power to output power, where Vin and Iin are measured:

$$Pin=Vin*Iin=Iout*(Vpvid-(Iout*Rloadline)+Iout*Rdrop)/\text{Efficiency}=Bf(Pvid)*Iout,$$

where Iout represents regulator output current, Vpvid represents output voltage set point, Rloadline represents regulator load line, and Rdrop represents regulator resistance drop, and where for each output voltage set point (Vpvid) voltage adjustments are made for regulator load line and regulator resistance drop respectively represented by −(Iout*Rloadline) and +(Iout*Rdrop), with a different factor Bf(Pvid) is used or calculated for each output power set point (Pvid).

Considering the simplest case with no load line or drop $$Pin=Vin*Iin=Iout*Vpvid/\text{Efficiency}=Bf(Pvid)*Iout, Bf(Pvid)=Vpvid/\text{Efficiency},$$

where Efficiency will change at each voltage set point.

A code method uses a different Bf for each set point for example from the look up table 114, while this can be done by calculated methods also without inputs from look up table.

It should be understood that control apparatus 100 is not limited to the illustrated arrangement of FIG. 1, for example, various functions can be implemented integral within the controller 104, such as control algorithms 112 and lookup table 114.

Figure 2:
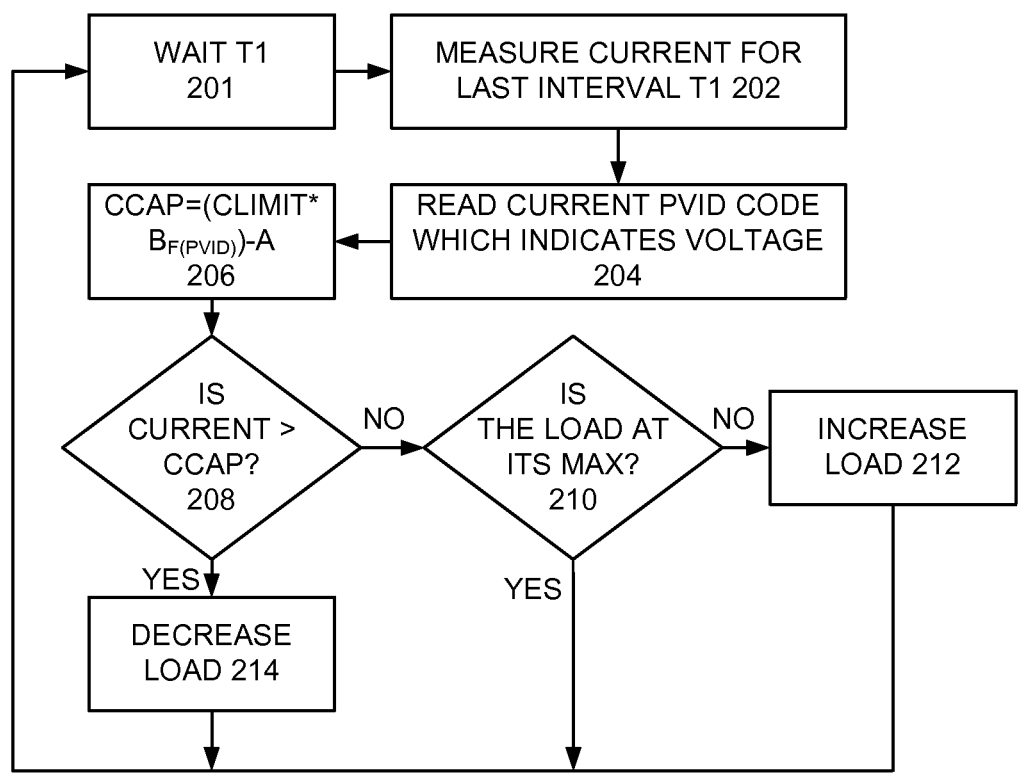
FIG. 2 is a flow chart illustrating example steps for implementing dynamic regulator output current limiting in accordance with the preferred embodiment.

Referring now to FIG. 2, there are shown example steps for implementing dynamic regulator output current limiting generally designated by the reference character 200 in accordance with the preferred embodiment. A predetermined time interval T1 is identified as indicated in a block 201. With a microprocessor based controller 104 the predetermined time interval T1 is, for example 32 milliseconds (msec) or with a digital power proxy hardware (HW) based controller 104 the predetermined time interval T1 is, for example 4 microseconds. The current is measured for the last interval T1 as indicated in a block 202. The measured current at block 202 is the average voltage regulator module (VRM) input current for the microprocessor controlled approach or the average digital power proxy value for HW approach for the last duration interval T1.

As indicated in a block 204, a current PVID code is read which indicates output voltage set point. For each output voltage set point (Vpvid), a different multiplier Bf(Pvid) is used or calculated to identify a current capping limit CCAP. As indicated in a block 206, the new current capping limit CCAP is identified, for example, as provided by the following equation:

$$CCAP=(CLIMIT)*Bf(Pvid)-A,$$

where the multiplier Bf(Pvid) is a function of the current regulator output voltage set point (Vpvid), and all Bf(Pvid) values are set to 1 at initialization, and there is a unique Bf(Pvid) value for each output voltage set point (Vpvid), when fully implemented; and A is an offset value.

As indicated in a decision block 208, the measured current at block 202 is compared to the calculated new current capping limit CCAP, where the CCAP calculation is adjusted based on the output voltage set point, removing tolerance build up between output over current and input power sensing.

When the measured current is less than the calculated new current capping limit CCAP, then checking whether the regulator load is at its maximum is performed as indicated in a decision block 210. When the regulator load is at its maximum, then no action is taken and the steps return to block 201 to wait for a next predetermined time interval T1 and are repeated. When the regulator load is at its maximum, then the regulator load is increased as indicated in a block 212, then the steps return to block 201 to wait for a next predetermined time interval T1 and are repeated.

When determined at decision block 210 that the measured current is greater than the calculated new current capping limit CCAP, then the regulator load is decreased as indicated in a block 214, then the steps return to block 201 to wait for a next predetermined time interval T1 and are repeated.

Figure 3:
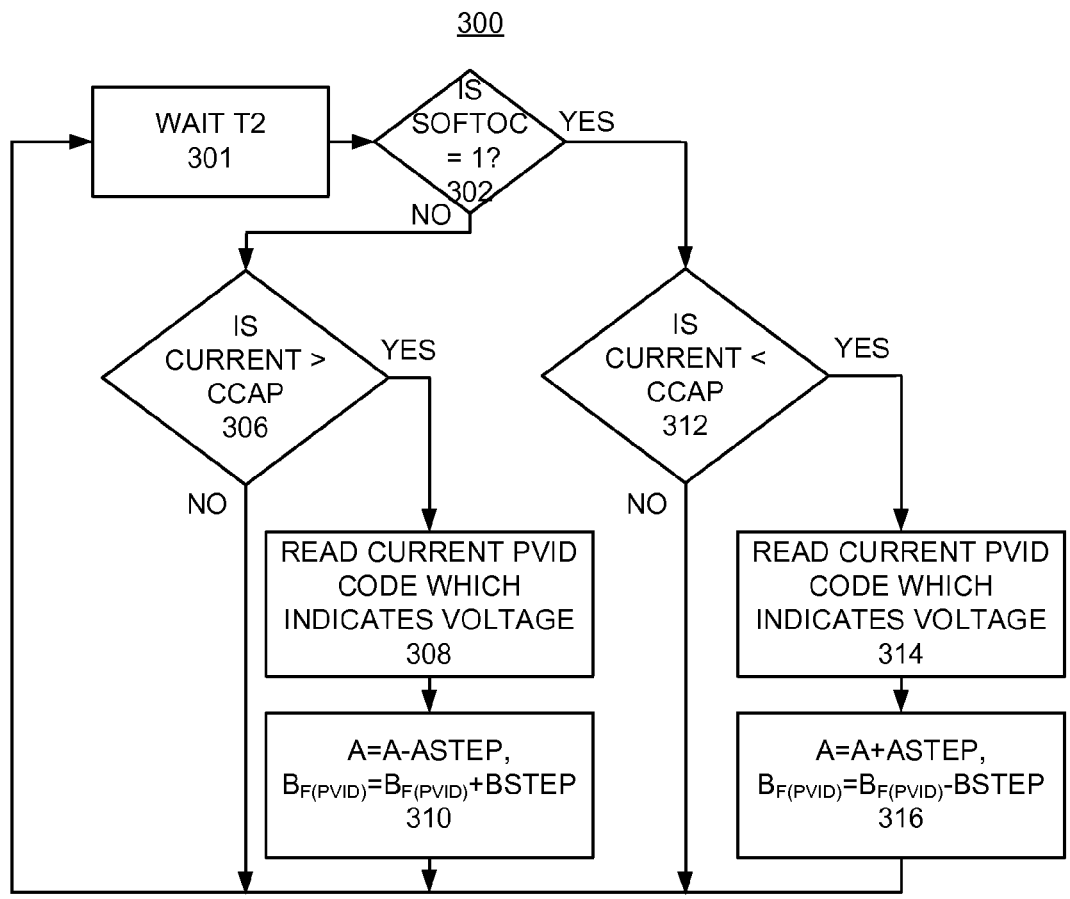
FIG. 3 is a flow chart illustrating further example steps including a shorter time scale loop for implementing dynamic adapted output current limiting based upon sampling of a soft over current binary output in accordance with the preferred embodiment.

Referring now to FIG. 3, there are shown further example steps generally designated by the reference character 300 including a shorter time scale loop for implementing dynamic adapted output current limiting based upon sampling of a soft over current binary output in accordance with the preferred embodiment. As indicated in a block 301, a predetermined time interval T2 is identified, which provides a shorter time scale loop of steps 300 than the time scale loop of steps 200 of FIG. 2. With a microprocessor based controller 104 the predetermined time interval T2 is, for example 1 millisecond (msec) or with a digital power proxy hardware (HW) based controller 104 the predetermined time interval T2 is, for example 1 microseconds.

In FIG. 3, steps 300 adapt the current limit based upon sampling of the binary soft OC output. As indicated in a decision block 302, checking is performed to determine if an indicator SOFTOC=1. The indicator SOFTOC trip point is related to the output power measurements. When the regulator 102 sees a higher current than the regulator's soft OC limit, it outputs the indicator SOFTOC to a control point, and the indicator SOFTOC is set to 1. The indicator SOFTOC is set to 0 when the regulator 102 sees a lower current than the regulator's soft OC limit.

When the indicator SOFTOC is not equal to 1, checking if the measured current is greater than the calculated new current capping limit CCAP as indicated in a block 306. If the measured current is not greater than the calculated new current capping limit CCAP, then the steps return to block 301 to wait for a next predetermined time interval T2 and are repeated. If the measured current is greater than the calculated new current capping limit CCAP, then the current PVID code is read which indicates the output voltage set point (Vpvid) as indicated in a block 308. Then Offset A is set to A−ASTEP, where ASTEP=1 for z, and 0 for p, and the scale factor Bf(Pvid) is set to Bf(Pvid)+BSTEP, where BSTEP=1/128 for p, and 1 for z as indicated in a block 310. Then the steps return to block 301 to wait for a next predetermined time interval T2 and are repeated.

When the indicator SOFTOC is equal to 1, checking if the measured current is less than the calculated new current capping limit CCAP as indicated in a block 312. If the measured current is greater than the calculated new current capping limit CCAP, then the steps return to block 301 to wait for a next predetermined time interval T2 and are repeated. If the measured current is less than the calculated new current capping limit CCAP, then the current PVID code is read which indicates the output voltage set point (Vpvid) as indicated in a block 314. Then Offset A is set to A+ASTEP, where ASTEP=1 for z, and 0 for p, and the scale factor Bf(Pvid) is set to Bf(Pvid)−BSTEP, where BSTEP=1/128 for p, and 1 for z as indicated in a block 316. Then the steps return to block 301 to wait for a next predetermined time interval T2 and are repeated.

Figure 4:
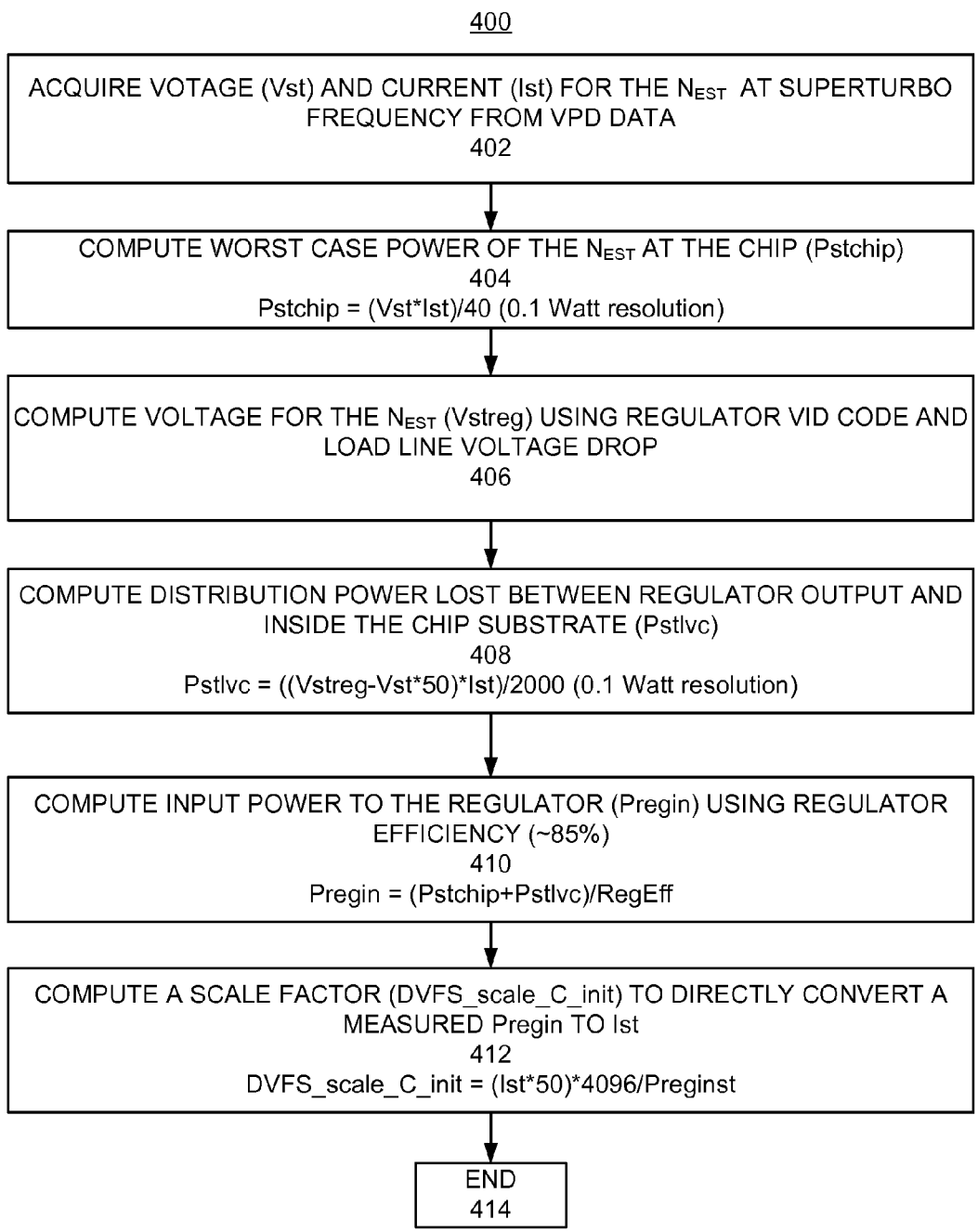
FIG. 4 is a flow chart illustrating example steps for implementing dynamic regulator output current limiting in accordance with the preferred embodiment.

Referring now to FIG. 4, there are shown further example steps generally designated by the reference character 400 for implementing dynamic regulator output current limiting in accordance with the preferred embodiment.

As indicated in a block 402, a voltage (Vst) and current (Ist) for the Nest at high or superturbo frequency are acquired from VPD 116. As indicated in a block 404, worst case power (Pstchip) is calculated of the Nest at the chip, for example, as follows:

$$Pstchip=(Vst*Ist)/40 \text{(in 0.1 Watt resolution)}$$

Next voltage (Vstreg) for the Nest is computed using the regulator VID code and load line voltage drop as indicated in a block 406. As indicated in a block 408, distribution power lost (Pstlvc) is computed between regulator output and inside the chip substrate, for example, as follows:

$$Pstivc=((Vstreg-Vst*50)*Ist)/2000 \text{(in 0.1 Watt resolution)}$$

As indicated in a block 401, input power (Pregin) to the regulator is computed using regulator efficiency of ~85%, for example, as follows:

$$Pregin=(Pstchip+Pstlvc)RegEff$$

As indicated in a block 412, a scale factor (DVFS_scale_C_init) is computed to directly convert a measured Pregin to Ist, for example, as follows:

$$DVFS\_scale\_C\_init=(Ist*50)*4096/Preginst$$

At runtime, TPMD can now estimate the VRM output current (Ist_est) using the following equation:

$$Ist\_est=Pregin*DVFS\_scale\_C\_init/4096 \text{(in 0.01 Amp resolution)}$$

The scaling on all current scalars is based, for example, on a 16-bit value of 40960 that is equivalent to 1.0. Thus, 24013 correspond to an actual gain of 0.586. Example steps 400 of FIG. 4 end as indicated in a block 414.

While the present invention has been described with reference to the details of the embodiments of the invention shown in the drawing, these details are not intended to limit the scope of the invention as claimed in the appended claims.

What is claimed is:

1. An apparatus for implementing dynamic regulator output current limiting comprising:
    a regulator includes a regulator input receiving an input voltage and input power and said regulator including a redundant regulator system;
    a controller coupled to said regulator; said controller receiving a measured input power of said regulator input and said controller receiving an operational mode from said regulator of operational modes of N+2, N+1, phase or phases running;
    said controller relating the measured input power to a regulator output current and a regulator over current trip point, and said controller dynamically providing regulator output current limiting; said controller decreasing a load frequency only in operational node N when the measured input power is greater than a regulator over current threshold and enabling running at full frequency in operational modes N+2, N+1.

2. The apparatus as recited in claim 1 includes an inline shunt resistor in said regulator input being used to measure the regulator input power.

3. The apparatus as recited in claim 2 includes a hardware operational amplifier (Op-amp) comparator circuit connected to said inline shunt resistor.

4. The apparatus as recited in claim 3 includes a high speed comparator; the measured input power being read with said high speed comparator.

5. The apparatus as recited in claim 1 includes said controller receiving vital product data (VPD) from said regulator.

6. The apparatus as recited in claim 1 further includes said controller changing a soft over current (OC) trip point as a function of said operational modes of N+2, N+1 or N phase or phases running.

7. The apparatus as recited in claim 1 wherein said controller relating the measured input power to a regulator output current includes said controller identifying a multiplier as a function of the current regulator output voltage set point, and said controller using said identified multiplier Bf(Pvid) to identify a current capping limit CCAP.

8. A method for implementing dynamic regulator output current limiting comprising:
   providing a regulator includes a regulator input receiving an input voltage and input power and providing a redundant regulator system;
   providing a controller coupled to said regulator;
   said controller receiving a measured input power of said regulator input and said controller receiving an operational mode from said regulator of operational modes of N+2, N+1, or N phases running;
   said controller relating the measured input power to a regulator output current and a regulator over current trip point,
   said controller dynamically providing regulator output current limiting; and
   said controller decreasing a load frequency only in operational mode N when the measured input power is greater than a regulator over current threshold and enabling running at full frequency in operational modes N+2, N+1.

9. The method as recited in claim 8 includes providing an inline shunt resistor in said regulator input; and using said inline shunt resistor to measure the regulator input power.

10. The method as recited in claim 9 wherein using said inline shunt resistor to measure the regulator input power includes providing a hardware operational amplifier (Op-amp) comparator circuit connected to said inline shunt resistor.

11. The method as recited in claim 9 includes providing a high speed comparator; and reading the measured input power with said high speed comparator DAC.

12. The method as recited in claim 8 includes said controller receiving vital product data (VPD) from said regulator.

13. The method as recited in claim 8 includes said controller changing a soft over current (OC) trip point as a function of said operational modes of N+2, N+1 or N phase or phases running.

14. The method as recited in claim 8 includes said controller identifying a multiplier as a function of the current regulator output voltage set point, and said controller using said identified multiplier to identify a current capping limit CCAP.

15. The method as recited in claim 8 includes said controller comparing a measured input current to said regulator with an identified current capping limit.

16. The method as recited in claim 15 includes said controller decreasing a regulator output load responsive to said measured input current being greater than said identified current capping limit.

17. The method as recited in claim 15 includes said controller increasing a regulator output load responsive to said measured input current being less than said identified current capping limit.

18. The method as recited in claim 15 includes said controller identifying a multiplier as a function of the current regulator output voltage set point responsive to said compared measured input current and said identified current capping limit.

19. The method as recited in claim 8 wherein said controller relating the measured input power to said regulator output current and said regulator over current trip point includes said controller measuring an average input current during a set time interval.

* * * * *